US008249268B2

(12) United States Patent
Jenq

(10) Patent No.: US 8,249,268 B2
(45) Date of Patent: Aug. 21, 2012

(54) WOOFER-LESS AND ENCLOSURE-LESS LOUDSPEAKER SYSTEM

(76) Inventor: Cheng Yih Jenq, Piscataway, NJ (US)

( * ) Notice: Subject to any disclaimer, the term of this patent is extended or adjusted under 35 U.S.C. 154(b) by 314 days.

(21) Appl. No.: 12/657,686

(22) Filed: Jan. 26, 2010

(65) Prior Publication Data

US 2011/0182440 A1 Jul. 28, 2011

(51) Int. Cl.
*H04B 3/00* (2006.01)
*H04R 1/20* (2006.01)
*H04R 25/00* (2006.01)

(52) U.S. Cl. .......................... 381/77; 381/339; 381/160

(58) Field of Classification Search .................... 381/77, 381/337, 339, 160, 162, 182, 186, 89; 181/144, 181/147, 155, 156, 199
See application file for complete search history.

(56) References Cited

U.S. PATENT DOCUMENTS 3,125,181 A 3/1964 Pawlowski
4,057,689 A 11/1977 Stallings, Jr.
4,554,414 A 11/1985 House
5,590,214 A 12/1996 Nakamura
5,742,696 A 4/1998 Walton
5,781,645 A 7/1998 Beale
5,894,524 A 4/1999 Kotsatos et al.
6,108,433 A 8/2000 Norris
7,016,508 B1 * 3/2006 Phelps ............................ 381/77
7,224,808 B2 5/2007 Spencer et al.
2004/0240697 A1 12/2004 Keele, Jr.
2005/0281413 A1 12/2005 Croft, III
2006/0153407 A1 * 7/2006 Keele et al. .................. 381/182
2006/0204016 A1 9/2006 Pham et al.
2007/0165878 A1 7/2007 Konagai

* cited by examiner

*Primary Examiner* — Ping Lee
(74) *Attorney, Agent, or Firm* — Gerald E. Hespos; Michael J. Porco

(57) ABSTRACT

A woofer-less and box-less loudspeaker system including a plurality of tweeter drivers is provided. The speaker system includes a plurality of drivers, each driver including a front face and a rear face with an axis of symmetry, each driver configured for propagating sound energy along the axis of each driver from the front face, wherein the sound energy includes low frequency and high frequency components; and a support structure for arranging the plurality of drivers in such a way that the axis extending from the rear face of each of the drivers converge in a single point in space, wherein as the sound is propagated along the axis of each driver from the front face, the high frequency components from each driver are evenly spaced and the low frequency components from each driver are reinforced by the low frequency components of adjacent drivers.

5 Claims, 8 Drawing Sheets

WOOFER-LESS AND ENCLOSURE-LESS LOUDSPEAKER SYSTEM

BACKGROUND

1. Field

The present disclosure relates generally to audio and speaker systems, and more particularly, to a woofer-less and enclosure-less loudspeaker system including a plurality of tweeter drivers and a method of tweeter driver placement.

2. Description of the Related Art

A tweeter driver converts an electrical signal to mechanical movement of a diaphragm in a back and forth motion along a line of axis of the driver. The sound wave exerted by the diaphragm travels in a peculiar way: the low frequency sound wave disperse spherically while the high frequency propagates along the line of axis of the tweeter driver, and the higher the frequency, the more narrow the propagation path. The result is that when a sound wave reaches a listener who is sitting in the line of axis of one speaker driver, e.g., a tweeter, he or she will hear only the high frequency part of the sound, since most of the low frequency component of the sound wave are well dispersed into space and become too thin to be heard.

SUMMARY

A woofer-less and enclosure-less loudspeaker system including a plurality of tweeter drivers and a method of tweeter driver placement are provided. The speaker system of the present disclosure uses multiple tweeter drivers to create a space of sound wave where high frequencies are evenly spaced, by angularly equal distance placement of the drivers, while low the frequencies are reinforced by each other tweeter drivers' output.

According to one aspect of the present disclosure, a speaker system for providing uniform sound in a listening area is provided, including a plurality of drivers, each driver including a front face and a rear face with an axis of symmetry extending from both the front face and the rear face, each driver configured for propagating sound energy along the axis of each driver from the front face, wherein the sound energy includes low frequency and high frequency components; and a support structure for arranging the plurality of drivers in such a way that the axis extending from the rear face of each of the drivers converge in a single point in space, wherein as the sound is propagated along the axis of each driver from the front face, the high frequency components from each driver are evenly spaced and the low frequency components from each driver are reinforced by the low frequency components of adjacent drivers.

In one aspect, the driver is a tweeter.

In another aspect, each of the plurality of drivers are equidistant from the converge point. In other aspects, at least one first driver is positioned at a different distance than at least one second driver.

In a further aspect, the support structure is configured in a spherical shape. In other aspects, the support structure is configured in a planar shape, cylindrical shape, cubical shape or spiral shape.

In yet another aspect, a speaker system for providing uniform sound in a listening area includes a plurality of tweeter drivers, each tweeter driver including a front face and a rear face with an axis of symmetry extending from both the front face and the rear face, each tweeter driver configured for propagating sound energy along the axis of each tweeter driver from the front face, wherein the sound energy includes low frequency and high frequency components; a support structure for arranging the plurality of tweeter drivers in such a way that the axis extending from the rear face of each of the tweeter drivers converge in a single point in space, each of the plurality of drivers being equidistant from the converge point; and at least one reflector positioned adjacent to at least one tweeter driver along the axis of propagation from the front face, wherein as the sound is propagated along the axis of the at least one tweeter driver having at least one reflector, the high frequency components are reflected back toward the front face creating an acoustic shadow behind the at least one reflector and the low frequency components are diffracted to fill the acoustic shadow area behind other reflectors. In this embodiment, the support structure may be configures as an open-ended hemisphere, an arc, a planar surface, etc.

According to another embodiment, the speaker system further includes a carrier wave generator for generating a carrier wave of ultrasound frequency, wherein an input electrical sound signal is superimposed on the carrier wave before being input to the plurality of drivers.

BRIEF DESCRIPTION OF THE DRAWING

The above and other aspects, features, and advantages of the present disclosure will become more apparent in light of the following detailed description when taken in conjunction with the accompanying drawings.

Figure 1:
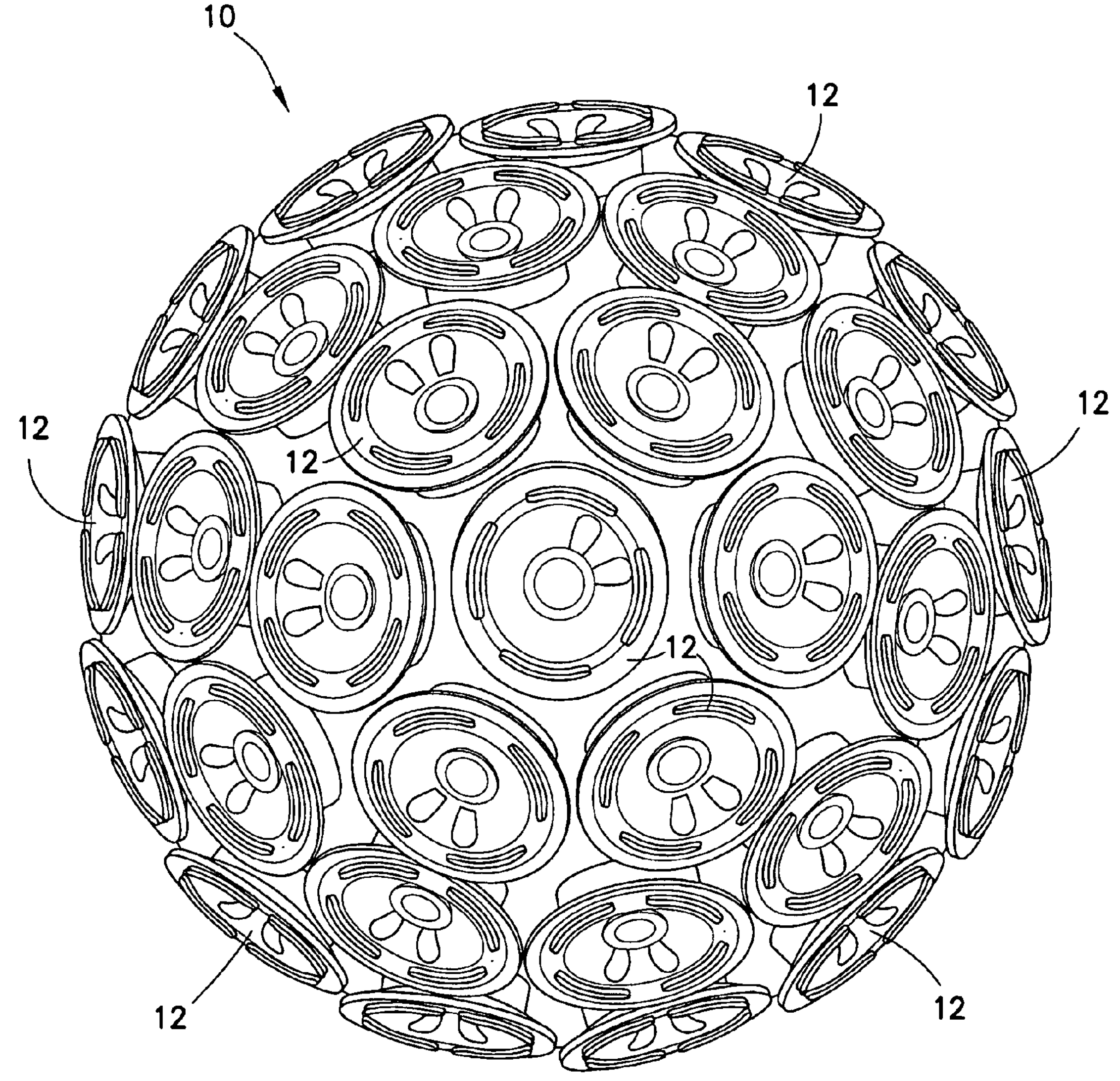
FIG. 1 is a three-dimensional (3D) view of a speaker system in accordance with the present disclosure.

To facilitate understanding, identical reference numerals have been used, where possible, to designate identical elements that are common to the figures, except that alphanumerical suffixes may be added, when appropriate, to differentiate such elements. The images in the drawings are simplified for illustrative purposes and are not depicted to scale.

The appended drawings illustrate exemplary embodiments of the present disclosure and, as such, should not be considered as limiting the scope of the disclosure that may admit to other equally effective embodiments. Correspondingly, it has been contemplated that features or steps of one embodiment may beneficially be incorporated in other embodiments without further recitation.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A woofer-less and box-less loudspeaker system including a plurality of tweeter drivers and a method of tweeter driver placement are provided. This invention uses multiple tweeter drivers to create a space of sound wave where high frequencies are evenly spaced, by angularly equal distance placement of the drivers, while the low frequencies are reinforced by each other tweeter drivers' output. The placement of the drivers can be almost anywhere except their angles are very important, that is, the placement is concentric and evenly dispersed in angle. The configuration of the drivers are three dimensional, and therefore, the resultant shape and form could be cubical, planar, spherical, cylindrical, etc.

Referring to FIG. 1, a three-dimensional (3D) view of a speaker system 10 in accordance with the present disclosure is illustrated. The speaker system 10 includes a plurality of drivers 12. The drivers 12 employed in the present disclosure are tweeters used in conventional loudspeakers. Exemplary tweeters or tweeter drivers are disclosed in U.S. Pat. No. 5,742,696 to Walton entitled "Modular Tweeter" and U.S. Pat. No. 5,894,524 to Kotsatos et al. entitled "High Power Tweeter", the contents of both of which are hereby incorporated by reference. Conventional tweeters usually are capable of producing output in the frequency range of 2,000 to 20,000 Hz and higher. The drivers employed in the present disclosure are all equal in physical properties.

Figure 2C:
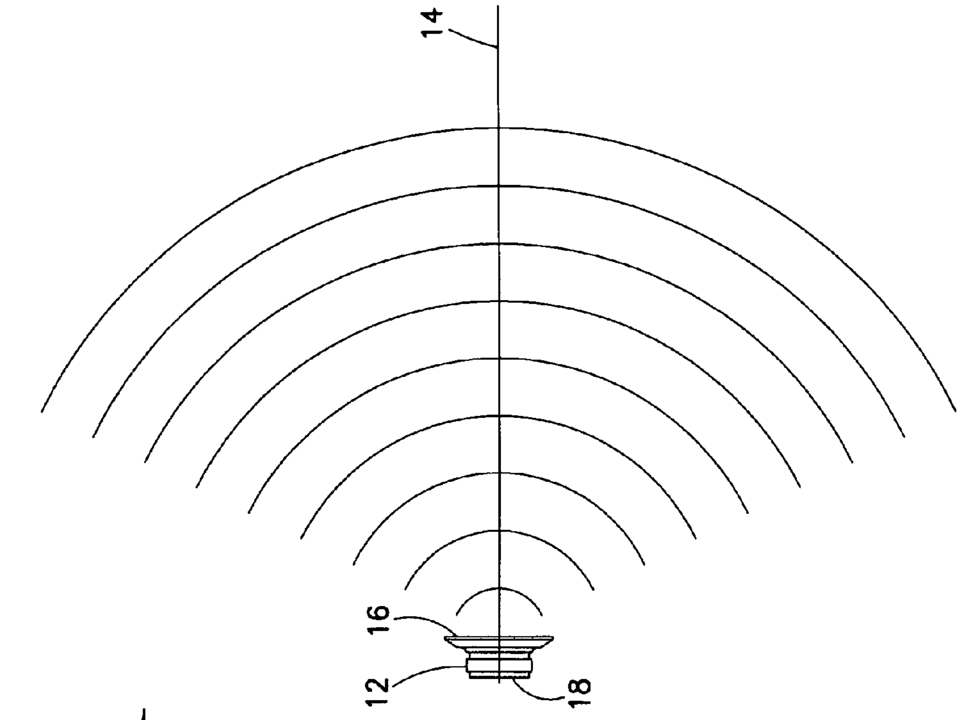
FIG. 2B illustrates a high frequency propagation pattern of a sound wave and FIG. 2C illustrates a low frequency propagation pattern of a sound wave along the line of axis of a driver.
Figure 2A:
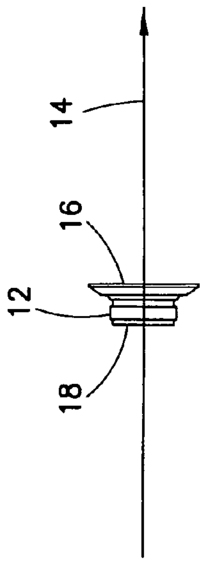
FIG. 2A illustrates a line of axis of a driver.
Figure 2B:
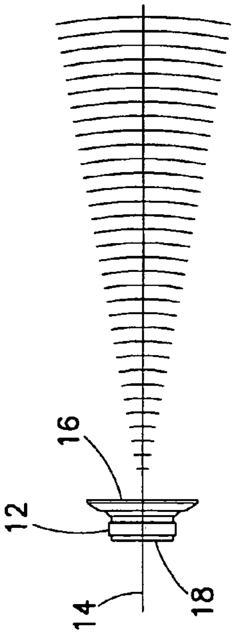

Referring to FIG. 1A, for each driver 12, there is an imaginary line of axis 14 which is the line of geometrical symmetry. Each driver 12 include a front face or surface 16 and a rear or back surface 18. This imaginary line of axis 14 extends in both direction from the rear surface 18 through the front surface 16 of the driver 12. Since the driver's diaphragm, in the case of a dome tweeter, has its motion along this line of axis 14, this line of axis also represent the direction of the propagation of the sound wave, which generally propagates from the front face 16 of the driver along this axis 14. FIG. 2B illustrates a high frequency propagation pattern and FIG. 2C illustrates a low frequency propagation pattern for driver 12 along the line of axis 14.

Figure 3A:
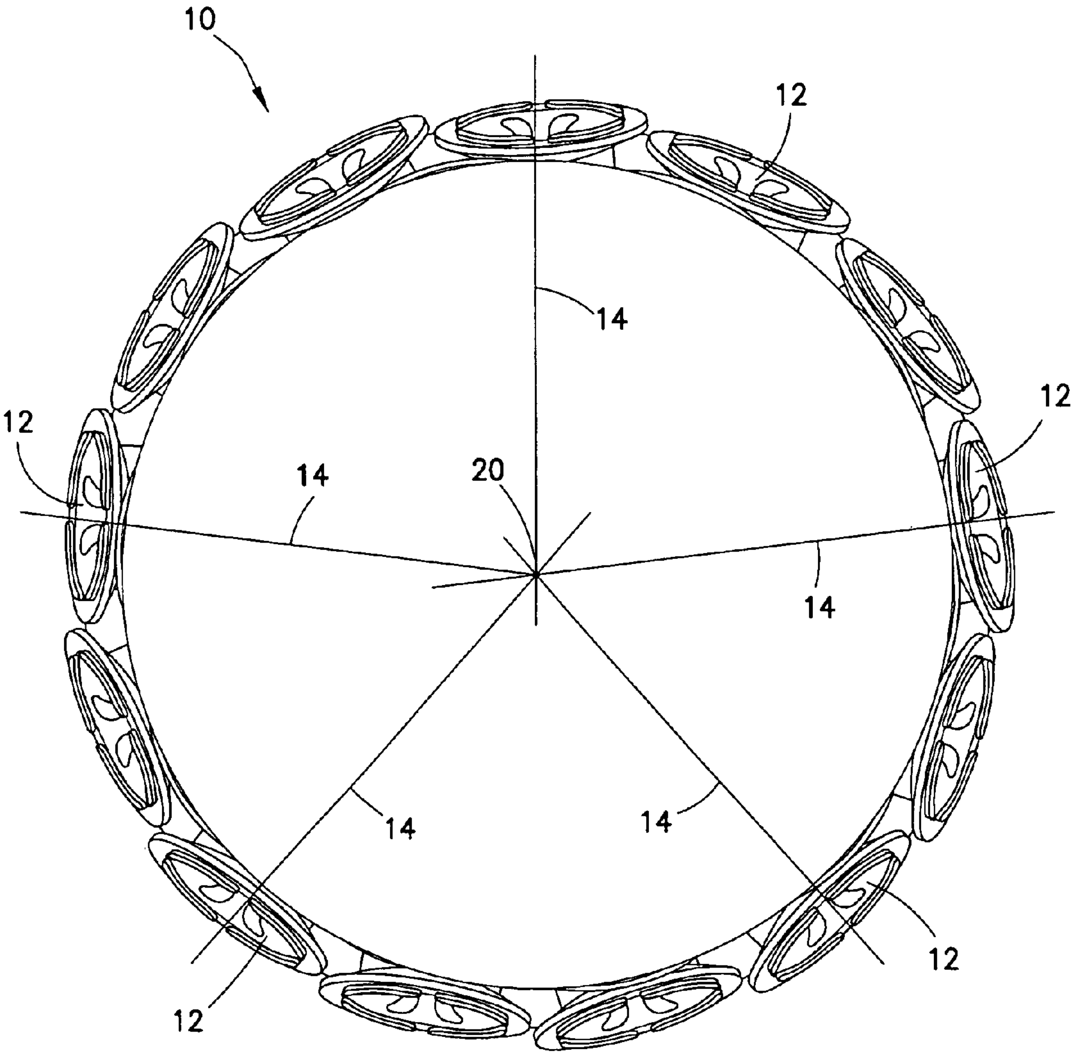
FIG. 3A is a cross sectional view of the speaker system shown in FIG. 1 in accordance with an embodiment of the present disclosure.

A plurality of drivers 12 are clustered and placed in space that, preferably, the lines of axis of all drivers backward converge at one point in space behind a rear surface of each of the drivers, and that, the lines of axis are spread out evenly with equal angular distance from each other, so that in the vicinity of the clustered drivers the sounds produced are as evenly dispersed as possible. For example, FIG. 3A illustrates a cross sectional view of the speaker system shown in FIG. 1. As shown in FIG. 3A, the drivers 12 are arranged such that the lines of axis 14 of each driver 14 backward converge at a single point in space 20. In this embodiment, the drivers are equidistant from the point of convergence 20. Arrangement as such will make sure there is no crossing over of the lines of propagation of sound waves and that there is no concentration point in the listening area. By providing such an arrangement, the drivers provide low frequency reinforcement that can reach a listener whether the drivers are aim at the listener or not.

Figure 3B:
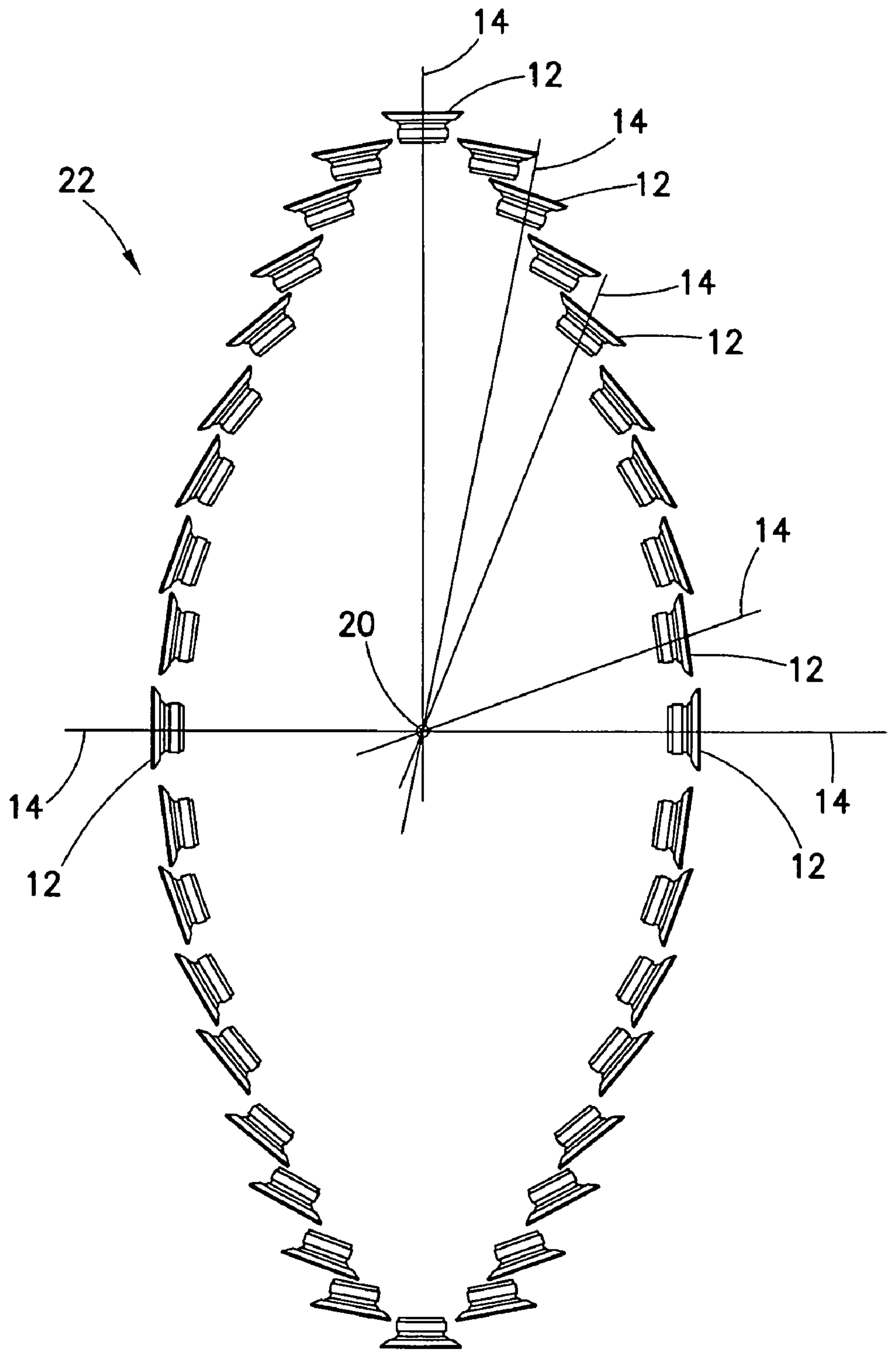
FIG. 3B is a cross sectional view of a speaker system in accordance with another embodiment of the present disclosure.

Although all drivers, preferably, share one common point of origination and convergence of the lines of axis, the distance of the drivers to this point does not have to be the same, i.e., various drivers may be placed at different distances from the point of convergence. As a result, the drivers placement are flexible to form planar, cylindrical, cubical, spiral or spherical shapes. For example, FIG. 3B illustrates a configuration 22 where the drivers 12 are arranged in an oval or convex shape. In this embodiment, each driver is arranged at a different angle relative to the other drivers while ensuring the backward converge of each drivers' line of axis 14 converge at a single point 20.

The louder speaker system constructed as above consists of no mid-range driver and of no woofer driver. Furthermore, the louder speaker system constructed as above consists of no box and/or enclosure, which are commonly employed in a conventional speaker. Conventional speaker drivers are mounted on a closed box and such an arrangement is in effect a "drum", which imparts its characteristic resonance to the sound material. Although the drivers 12 are assembled on some type of support structure, the structure is minimal to support the drivers but will not alter or effect the sound quality of the speaker system. In one embodiment, the support structure is configured from a wire frame. The wire frame will support the drivers without any coloration to the sound produced by the speaker system. It is to be appreciated that other support structures configured from various known materials may be employed to arrange the drivers in accordance with the teachings of the present disclosure. For example, the support structure may be configured as a tree-like structure, a honey comb structure with a hollow core, etc. In the speaker system in accordance with the principles of the present disclosure, the sound coloration as a result of the resonance of the box or enclosure is therefore completely eliminated.

By employing the principles of the present disclosure, several advantages can be achieved.

1. The speaker system in this invention can be configured as a ball shape, a column, a pyramid, a thin panel, an oval, and so on.
2. The speaker system is free of placement restriction. For example, as shown in FIG. 1, the speaker system is configured as a three dimensional spherical object emitting sound waves in all directions in space, equally in all directions, and is therefore called omni-directional. There is restriction to the relative position of a listener to the speaker system, and vice versa.
3. The speaker system will sound the same regardless of the listener's relative position, whether sitting, standing, or moving about.
4. The speaker system is free of the woofer's and the box's coloration of the sound.

5. The speaker system is compact and has a small footprint, making it ideal for a narrow space such as in a car. In a further example, the speaker system shown in FIG. 1 can be mounted on a pedestal, where the footprint of the system is the base of the pedestal which can be relatively small.

Figure 4:
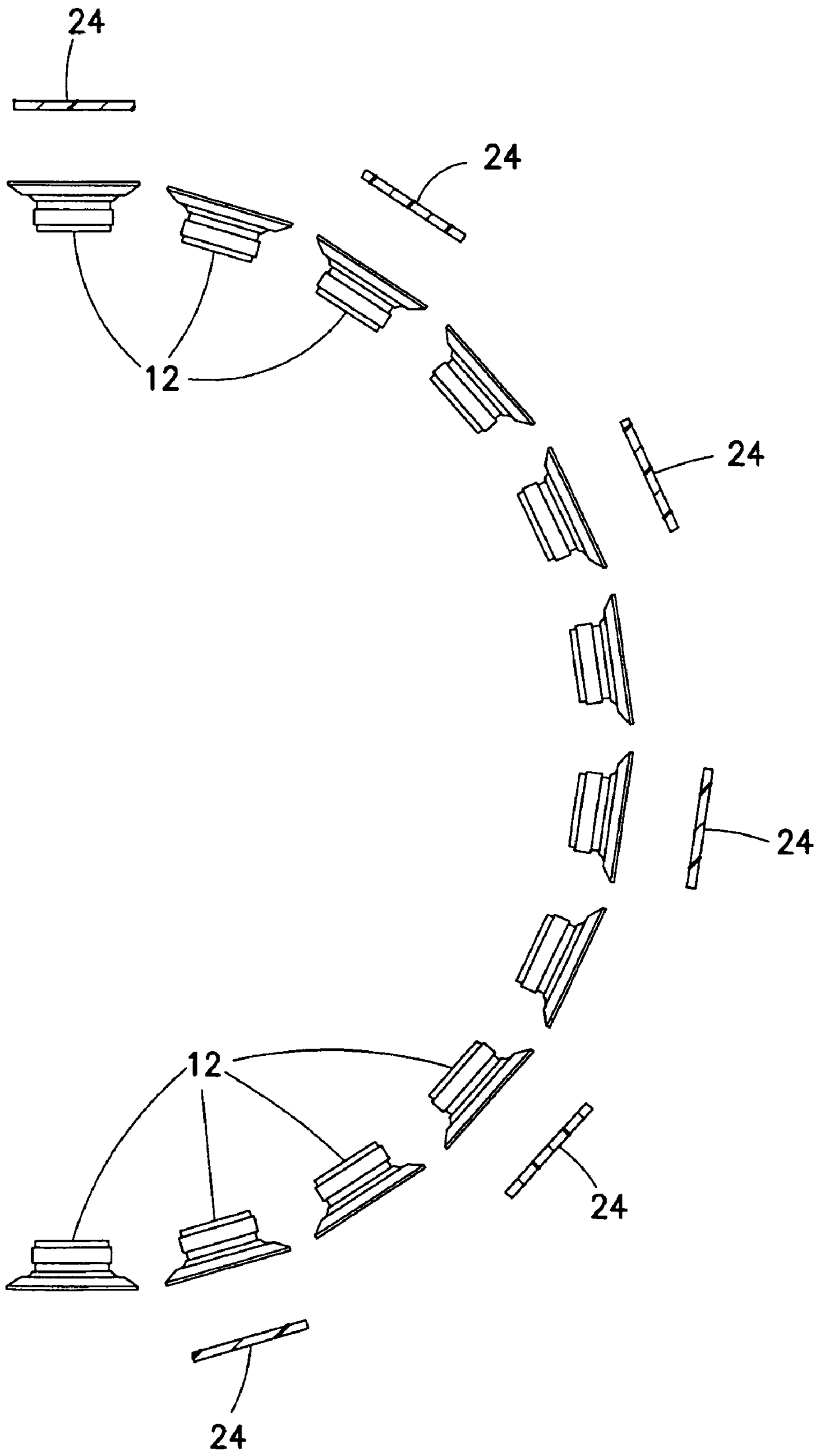
FIG. 4 is a partial cross sectional view of the speaker system shown in FIG. 1 which illustrates partial shielding in accordance with the present disclosure.
Figure 5:
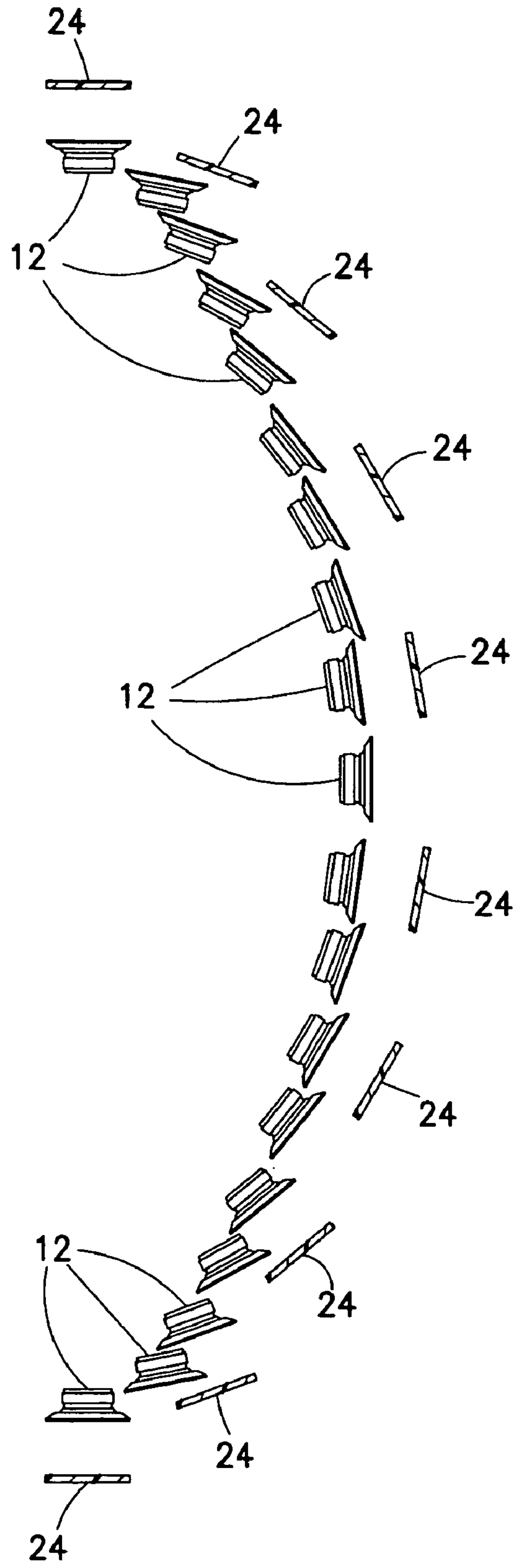
FIG. 5 is a partial cross sectional view of another embodiment of a speaker system which illustrates partial shielding in accordance with the present disclosure.
Figure 6A:
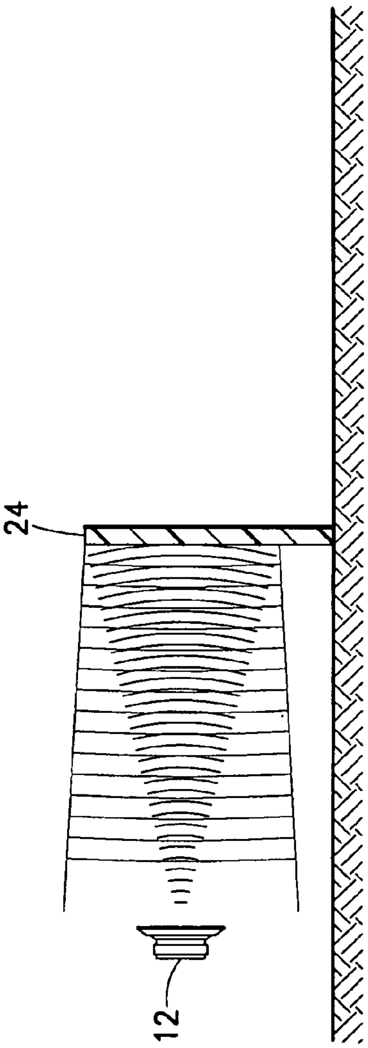
FIG. 6A illustrates a high frequency sound wave being reflected by a sound shield barrier or reflector and FIG. 6B illustrates a low frequency sound wave being diffracted by a barrier or reflector.
Figure 6B:
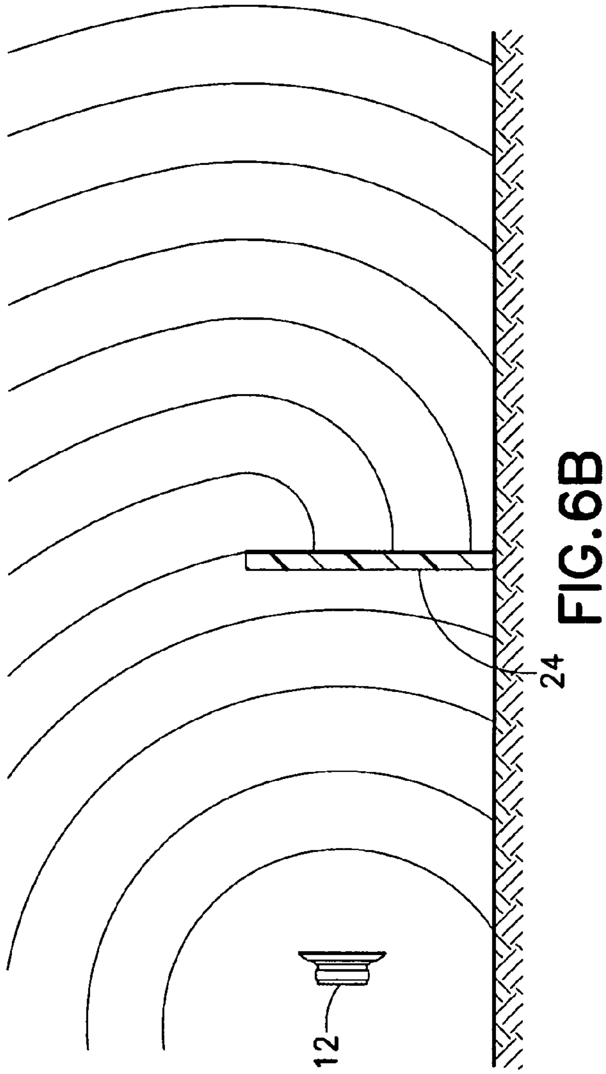

Although ideally the speaker system is a three dimensional cluster of tweeters, in some embodiments, the rear half of the cluster may be removed, leaving only the frontal half of the cluster, as illustrated in FIGS. 4 and 5, where FIG. 4 is a hemisphere configuration and FIG. 5 includes a single line of drivers configured on an oval shaped arc. The result is the sound quality, especially the low frequency portion or bass of the sound, is compromised, since some of the bass sound contributed from the rear half of the cluster is no longer available. In the listening area where the frontal half of the cluster is facing, the high frequency portion of the sound would be relatively too intense due to the reduced intensity of the low frequency. To correct this, partial shielding is used in which reflectors 24 are placed in front of some of the tweeters 12 to reduce the intensity of the high frequency portion of the sound, since it will be reflected backward. The low frequency will not be affected since it will diffract or diffuse around these reflectors. This principle is explained in FIG. 6 where FIG. 6A illustrates how a high frequency sound wave can be reflected by a sound shield barrier or reflector 24 which results in an acoustic quiet shadow area, while the low frequency sound wave can be diffracted by the same barrier or reflector 24 and fill the same shadow area as illustrated in FIG. 6B. Preferably, the reflectors 24 are made from a material that is inert to sound frequency such as plaster, styrene foam, cement, or any other material that does not resonant to any sound frequency.

Figure 7:
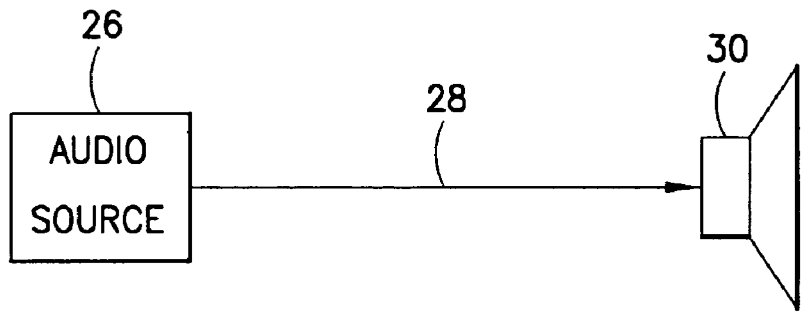
FIG.7 PRIOR ART
FIG. 7 is a schematic diagram of a conventional audio speaker system.
Figure 8:
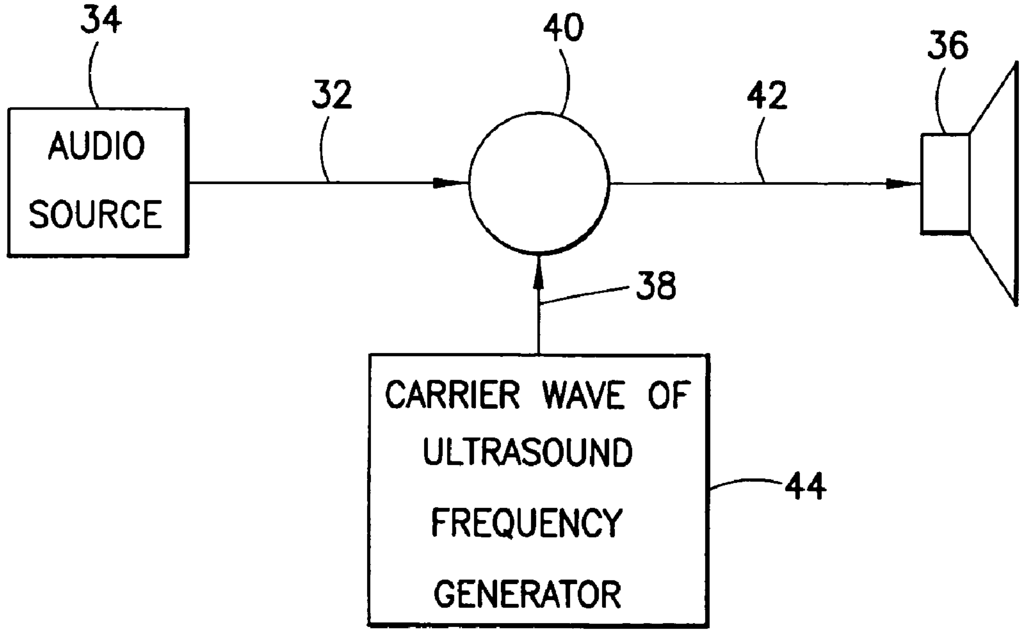
FIG. 8 is a schematic diagram of a audio speaker system in accordance with the present disclosure.

In one embodiment, the use of a carrier frequency in the ultrasound range to modulate an electrical signal of sound source for direct input to the above said speaker system is employed. In a conventional speaker system as shown in FIG. 7, an electrical signal 28 representing sound source material 26 enters the input terminal of the speaker system 30 so that the electrical signal 28 impels the diaphragm of the speaker to reproduce the sound source material. In the speaker system of the present disclosure, the electrical signal 32 from the audio source 34, before entering the speaker 36, is amplitude modulated with a carrier wave 38 of ultrasound frequency, the carrier wave being generated by generator 44, as shown in FIG. 8. The electrical sound signal 32 may be superimposed on the carrier wave 38 by a mixer 40 or any other known suitable means. The resultant signal 42 is then fed to the input terminal of the speaker 36.

The sound reproduced as described above, upon reaching a listener, is filtered off the ultrasound carrier frequency by the listener's ear, since human's ear is insensitive to the ultrasound frequency, leaving only the reproduced source sound. The carrier wave can be of a frequency above 20 kHz, which is beyond human ear's perception, or of the same frequency as the sampling frequency of digital sound material such as a Compact Disc (CD), e.g., the sampling frequency for the CD format is 44.1 kHz.

Since no conventional speaker driver can accept a DC signal and output a DC sound pressure, the ultrasound carrier embodiment of the present disclosure can "disguise" a DC signal into a high frequency signal and that can be handled by the speaker driver. The human ear will filter off the ultrasound and leaving only the DC sound signal to be heard. Such benefit applies to DC signals and extremely low frequencies.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

What is claimed is:

1. A speaker system for providing uniform sound in a listening area comprising:

a plurality of tweeter drivers, each tweeter driver including a front face and a rear face with an axis of symmetry extending from both the front face and the rear face, each tweeter driver configured for propagating sound energy along the axis of each tweeter driver from the front face, wherein the sound energy includes low frequency and high frequency components;

a support structure for arranging the plurality of tweeter drivers in such a way that the axis extending from the rear face of each of the tweeter drivers converge in a single point in space, each of the plurality of drivers being equidistant from the converge point; and at least one reflector positioned adjacent to at least one tweeter driver along the axis of propagation from the front face, wherein as the sound is propagated along the axis of the at least one tweeter driver having at least one reflector, the high frequency components are reflected back toward the front face creating an acoustic shadow behind the at least one reflector and the low frequency components are diffracted to fill the acoustic shadow area behind other reflectors.

2. The speaker system of claim 1, wherein the support structure is a hemisphere.

3. The speaker system of claim 1, wherein the sport structure is an arc.

4. The speaker system of claim 1, wherein the reflector comprises an inert material.

5. The speaker system as in claim 1, further comprising a carrier wave generator for generating a carrier wave of ultrasound frequency, wherein an input electrical sound signal is superimposed on the carrier wave before being input to the plurality of drivers.

* * * * *